Sept. 6, 1955          O. HAMMER          2,717,106
PASTRY ICING MACHINE
Filed Dec. 19, 1952
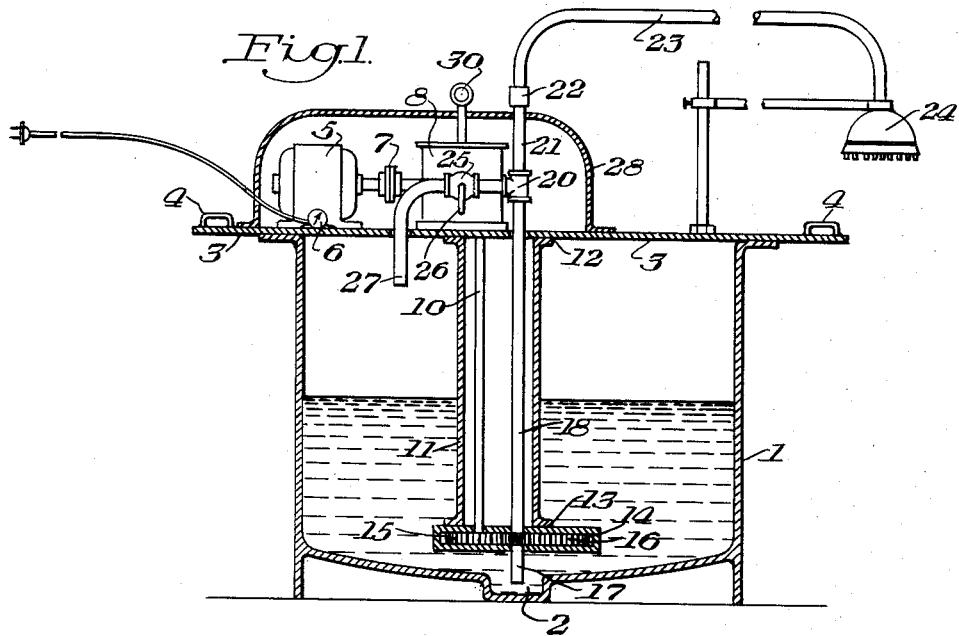
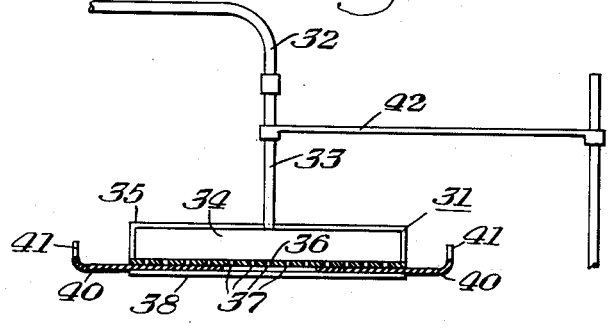
INVENTOR.
Oscar Hammer.
BY
HIS ATTORNEY.

United States Patent Office 2,717,106
Patented Sept. 6, 1955

2,717,106

PASTRY ICING MACHINE

Oscar Hammer, Pittsburgh, Pa.

Application December 19, 1952, Serial No. 326,998

3 Claims. (Cl. 222—318)

This invention relates generally to a machine for dispensing prepared mixes and the like in making baked goods and more particularly for dispensing icings.

In large bakeries, machines must be employed to dispense mixes and icings to produce baked goods in large quantities. Some of these mechanized bakeries have machines for dispensing such mixes, but they are formed integral with large kettles and when the mix or icing is being cooked, the dispensing equipment attached thereto cannot be used. Thus, every kettle is required to have its own dispensing equipment which amounts to a very large outlay in heavy, cumbersome and costly equipment that is usable only when it is time to dispense the material from such kettles.

The principal object of this invention is the provision of a dispensing equipment that is separate from the cooking kettle and which may be carried to different kettles to dispense different materials and thus be made independent of the kettle. This dispensing apparatus may be inserted into hot water to be flushed out before being transferred from one kettle to another which contains different mixes. Again, different nozzle heads may be employed to dispense different mixes from the same apparatus, or different shapes of nozzle dispensing heads.

The dispensing machine comprises a frame which may be constructed like a ladder or it may be a solid plate that carries the structure and at the same time covers the kettle. This frame is provided with a motor, preferably electric, and a reducing gear. A housing is provided underneath the frame to support the pump and enclose the drive shaft and the discharge pipe. The pump may be of the gear type which provides an inlet on one side and an outlet on the other. The outlet side of the pump may be attached to the housing and sealed therewith to prevent the mix from getting on the shaft or on the discharge pipe. Discharge nozzles of different sizes and shapes are placed on the end of a flexible hose that is attached to the discharge pipe. In discharge nozzles, one may provide adjustable openings with slides and the like, but it is preferable not to have a control valve. Since the discharge nozzles offer resistance to flow of the material passing therethrough, they may be controlled by the speed of the pump and a bypass valve for the pump or the latter alone.

The bypass valve merely opens a line of low flow resistance back to the kettle on which the apparatus is placed. Such a unitary portable dispensing machine can be employed to dispense from quite a few kettles and may be inserted and operated in hot water to clean out the pump and passages. This apparatus is far more versatile than when permanently attached to the kettle.

Other objects and advantages occur in the following description and claims.

The accompanying drawings show for the purpose of exemplification without limiting the invention or claims thereto certain practical embodiments wherein:

Fig. 1 is a sectional view showing the dispensing apparatus applied to a kettle.

Fig. 2 is a sectional view of a different type of a dispensing nozzle.

Referring to the drawings, the container or kettle 1 is independent of the dispensing device and is preferably provided with a sump 2 for the mix or icing to collect toward the end of the batch.

The dispensing device comprises the frame 3 which in this instance is a plate and is provided with lifting handles 4, to permit the dispensing device to be carried from one kettle to another. A motor 5, having a speed control 6, is mounted on the frame 3, and is connected through the coupling 7 to the speed reducer and transmission device 8. Thus, this device not only reduces the speed of the motor, but also provides for a vertical output drive that is secured to the drive shaft 10.

A tubular housing 11 is secured to the under side of the frame 3 as indicated at 12. This lower end of the tubular housing 11 is secured as indicated at 13 to the housing of the pump 14. Thus, the housing 11 is sealed at both ends and no material of the mix can work its way into the interior. The pump indicated is a gear type pump with one gear 15 secured to the end of the shaft 10 and the other gear 16 in mesh therewith. The inlet 17 is on one side of the meshed gears and the outlet is on the other side and is provided with the outlet pipe 18 that preferably extends up through the housing 11, and out through the frame 3 where it is provided with a T joint 20. The straight branch of the T joint is provided with the nipple 21 having a coupling 22 for the flexible hose 23 that terminates in the discharge nozzle 24 which in this instance is circular, having a series of holes making it adaptable for icing round cakes.

The lateral branch of the T joint 20 is connected through a nipple to the valve 25 with the handle 26. The other end of the valve 25 is connected to the pipe 27 that empties back into the kettle. This valve thus provides control of from zero to full discharge of the pump 14 because the bypass line 27 has less resistance than the dispensing head 24. The variable speed device 6 may also be employed alone or in combination with the bypass valve 25 to control the dispensing of the mix through the discharge nozzle 24.

A housing 28 may be employed to enclose the motor 5, the gear reducer 8, the valve 25, and the T connection 20 and thus, keep the mix off these parts. The valve handle 26 extends beyond the housing 28 so that it may be operated without opening the housing 28. The discharge pipe 21 preferably extends out of the housing so that the nozzles and their hoses may be readily changed.

A lifting eye 30 may be provided to raise the device by a crane for placing it on different kettles. Since no pressure is employed on the kettle no seal is necessary for the frame.

In Fig. 2, a nozzle 31 is shown connected to its flexible discharge hose 32 and stiff manipulating tube 33. The tube 33 opens into the chamber 34 formed by the casing 35. The lower end of this housing has a removable plate 36 provided with a series of ports or holes 37. The sides of the casing are provided with inturned flanges 38 that form a track for the shutters 40 which are solid plates that cover a selected number of the holes 37 when slid in and out by the handles 41, thus making the discharge area longer or narrower, as the case may be.

These nozzles may be manipulated by hand, or they may be suspended by the bracket 42 over an endless belt on which the baked goods are placed and caused to travel under the nozzle.

I claim:

1. A machine for icing baked goods and the like which comprises a portable frame adapted to be moved from one container to another, a sealed tubular housing depending from said frame, a pump mounted on the lower end of said housing and having an inlet adjacent the bottom of the container when the frame is positioned to permit the housing to depend therein, motor means carried by said frame and connected through the tubular housing to operate said pump, a pump outlet including a pipe extending up through the housing to the frame, and a discharge nozzle connected to said pump outlet pipe to dispense the icing from the container.

2. A machine for icing baked goods and the like which comprises a portable frame adapted to be moved from one container to another, a sealed tubular housing depending from said frame, a pump mounted on the lower end of said housing and having an inlet adjacent the bottom of the container when the frame is positioned to permit the housing to depend therein, the motor means carried by said frame and connected through the tubular housing to operate said pump, a pump outlet including a pipe extending up through the housing to the frame a continuously open discharge nozzle connected to said pump outlet to dispense the icing from the container, a bypass carried by said frame and connected to said pump outlet, and a manually operated valve in said bypass to regulate and stop the flow through the said open discharge nozzle.

3. A machine for icing baked goods and the like which comprises a portable unitary structure having a frame, motor means carried by said portable frame, a downwardly extending sealed tubular housing secured at its upper end to said frame, a pump with an inlet and an outlet and secured to the lower end of the tubular housing, a shaft in said tubular housing to connect said motor means and said pump to drive the same, an independent conduit in said tubular housing extending from the outlet of said pump to above said frame for connection to a continuously open discharge nozzle, said housing sealing off said shaft and conduit, and a manually controlled bypass on said frame and connected to said conduit for selectively returning the material pumped to adjacent the pump, whereby said portable unitary frame structure may be transported from one container to another.

References Cited in the file of this patent
UNITED STATES PATENTS

| | | |
|---|---|---|
| 1,800,333 | Wertz | Apr. 14, 1931 |
| 1,930,293 | Valentine | Oct. 10, 1933 |